United States Patent [19]

Tachibana et al.

[11] Patent Number: 5,284,505
[45] Date of Patent: Feb. 8, 1994

[54] METHOD FOR RECOVERING METALLIC NICKEL FROM FERRIC CHLORIDE WASTE LIQUID

[75] Inventors: Keiichi Tachibana, Higashiosaka; Ryoichi Tachibana, Daito, both of Japan

[73] Assignee: Hakima Kasaku Kogyo Kabushiki Kaisha, Hyogo, Japan

[21] Appl. No.: 999,158

[22] Filed: Dec. 31, 1992

[51] Int. Cl.$^5$ .............................................. C22B 3/46
[52] U.S. Cl. ...................................... 75/738; 156/642
[58] Field of Search ......................... 75/738; 156/642; 423/150.3; 210/912

[56] References Cited

U.S. PATENT DOCUMENTS 4,940,337  7/1990  Nakaji et al. ...................... 210/912

FOREIGN PATENT DOCUMENTS 61-44814  10/1986  Japan.
2-229724   9/1990  Japan.
3079779    4/1991  Japan .................................. 156/642

Primary Examiner—Melvyn J. Andrews
Attorney, Agent, or Firm—Bacon & Thomas

[57] ABSTRACT

Nickel ion contained in a ferric chloride waste liquid is recovered as metallic nickel by the following method. Firstly, the ferric chloride waste liquid is added with metallic iron and then heated and stirred to precipitate the metallic nickel. Thereafter the sludge containing this metallic nickel precipitate and the suspension are separated. Then, after the ferric chloride waste liquid is poured into the sludge and then heated and stirred so as to dissolve an iron constituent of the sludge and react it with the ferric chloride waste liquid, the suspension and the sludge are separated. After that, the sludge after the concentration process is taken out.

11 Claims, 3 Drawing Sheets

METHOD FOR RECOVERING METALLIC NICKEL FROM FERRIC CHLORIDE WASTE LIQUID

BACKGROUND OF THE INVENTION

1. Field of the Invention

The present invention relates to a method for effectively recovering nickel as a useful metal from a sludge by increasing the proportion of a nickel constituent contained in the sludge at the time of precipitating as the sludge the nickel dissolved in the ferric chloride waste liquid containing nickel and other heavy metals such as the etching waste liquid during reproduction of the ferric chloride waste liquid.

Generally, the ferric chloride waste liquid is used broadly as an etching liquid for precisely processing a metal plate made of stainless steel, nickel alloy and so on. As the etching liquid is used repeatedly for the corrosive treatment, it is apt to accumulate heavy metal ions such as nickel ion and the like therein as well as tervalent ions are reduced to bivalent ones. Meantime the etching liquid loses its corrosive effect and finally becomes the waste liquid. Since many pollution-related problems arise when this waste liquid is dumpted much after having been merely neutralized by alkali, it is requested to apply the reproductive and recycle process to the waste liquid.

2. Description of the Prior Art

As a method for reproducing the aforementioned waste liquid it might be proposed to blow the chlorine gas into the waste liquid directly so as to oxidize the bivalent iron ions to the tervalent ones. Practically, however, a corrosive effect of the reproduced process liquid doesn't recover sufficiently by this processing method. The reason is assumed that the heavy metal ions such as the nickel ion dissolved from the metallic plate into the waste liquid by the etching process tend to obstruct the oxidizing reaction.

Then, such a reproduction processing method for recovering the corrosive effect sufficiently is proposed by the Japanese Patent Publication No. Sho 61-44814. According to this reproduction processing method, lumps of metallic iron are added to the waste liquid and then heated and stirred so as to precipitate heavy metals. After the precipitated metals have been removed as a sludge, the chlorine gas is blown into the waste liquid so as to reproduce the liquid to the ferric chloride liquid.

But, the above-mentioned reproduction processing method requires an excessive addition of the metallic iron for precipitating the heavy metals. The unreacted portion of this excessive metallic iron is apt to be contained much in the sludge produced. That is, since most of the metallic constituents in the sludge is occupied by the iron constituent, the proportion of useful metals such as the nickel contained therein is not very high. For example, in the case that the reproducing process is performed by addition of the metallic iron to the ferric chloride waste liquid produced by the etching for stainless steel, the iron constituent of the metal constituents in the sludge occupies more than 90% and the nickel constituent is less than 10%. As a result, since it is impossible to effectively recover the useful metals such as the nickel from the obtained sludge, disadvantageously an economical value of the sludge is low.

On one hand, in order to reproduce the ferric chloride waste liquid effectively, formerly the inventor of the present invention proposed such a method as to increase a processing reaction speed by adding metallic copper together with the metallic iron (refer to the Japanese Patent Layed Open Publication No. Hei 2-229724). But, there are several problems associated with this method, although the processing reaction speed is increased, that the metallic copper increases the reproduction cost while similarly to the prior art, since the sludge contains the excessive unreacted metallic iron much, the proportion of such useful metals contained in the sludge is low. Further, since the sludge contains also much added metallic copper, the purity of the precipitated metallic nickel is low and the economical value of the sludge is still low.

SUMMARY OF THE INVENTION

The present invention is directed to solving the above-mentioned problems and has for its objects to increase the proportion of nickel of the metallic constituents contained in precipitated sludge at the time of reproduction of the ferric chloride waste liquid so that the economical value of the sludge can be improved.

For accomplishing the aforementioned object, the present invention presents the following method for recovering the metallic nickel from the ferric chloride waste liquid containing nickel ion.

That is, metallic iron is added to a liquid to be treated (referred to as a treated liquid hereinafter) comprising a ferric chloride waste liquid, then the treated liquid is heated and stirred so that the contained nickel ions can be reduced to metallic nickel as well as a ferrous chloride liquid can be produced, and a suspension containing the ferrous chloride liquid and a sludge containing a precipitate of the metallic nickel are separated. Next, after a fresh ferric chloride waste liquid is poured into the separated sludge and then heated and stirred so that an iron constituent of the sludge can be dissolved to react upon the ferric chloride waste liquid, the suspension and the sludge deposited therein are separated. After that, the sludge after this concentration process is taken out.

The ferric chloride waste liquid becomes the ferrous chloride by the reaction with the added metallic iron. Thereupon, the nickel ion in the waste liquid is reduced by the metallic iron which has been excessively added, so that the metallic nickel precipitates in the sludge. When the ferric chloride waste liquid is added to the sludge containing the metallic nickel and a great deal of unreacted iron, the metallic constituents in the sludge are dissolved therein. The nickel ion in the ferric chloride waste liquid is further reduced so that the metallic nickel can precipitate and the nickel constituent of the sludge can be enriched.

As a result, according to the present invention, it is possible to increase the proportion of the metallic nickel contained in the recovered sludge and to improve the economical value by such a simple processing method as to add the waste liquid to the sludge produced during the reproducing process of the ferric chloride waste liquid.

Further, since a method for recovering nickel according to the present invention can be set into the reproducing process steps of the ferric chloride waste liquid so as to be performed by utilizing a reproduction processing reaction vessel as it is, a special facility is not needed anew and the method can be carried out remarkably inexpensively.

Furthermore, since the added metallic iron is consumed for production of the ferric chloride liquid, material resources can be recycled without any waste and utilized effectively.

BRIEF DESCRIPTION OF THE DRAWINGS

FIG. 1 is a flowchart of the whole of reproducing process steps for the ferric chloride liquid in which the first embodiment is assembled;

FIG. 2 is a schematic view of an apparatus showing the flow of reproduction process of ferric chloride waste liquid.

DETAILED DESCRIPTION OF PREFERRED EMBODIMENTS

First Embodiment

Figure 1:
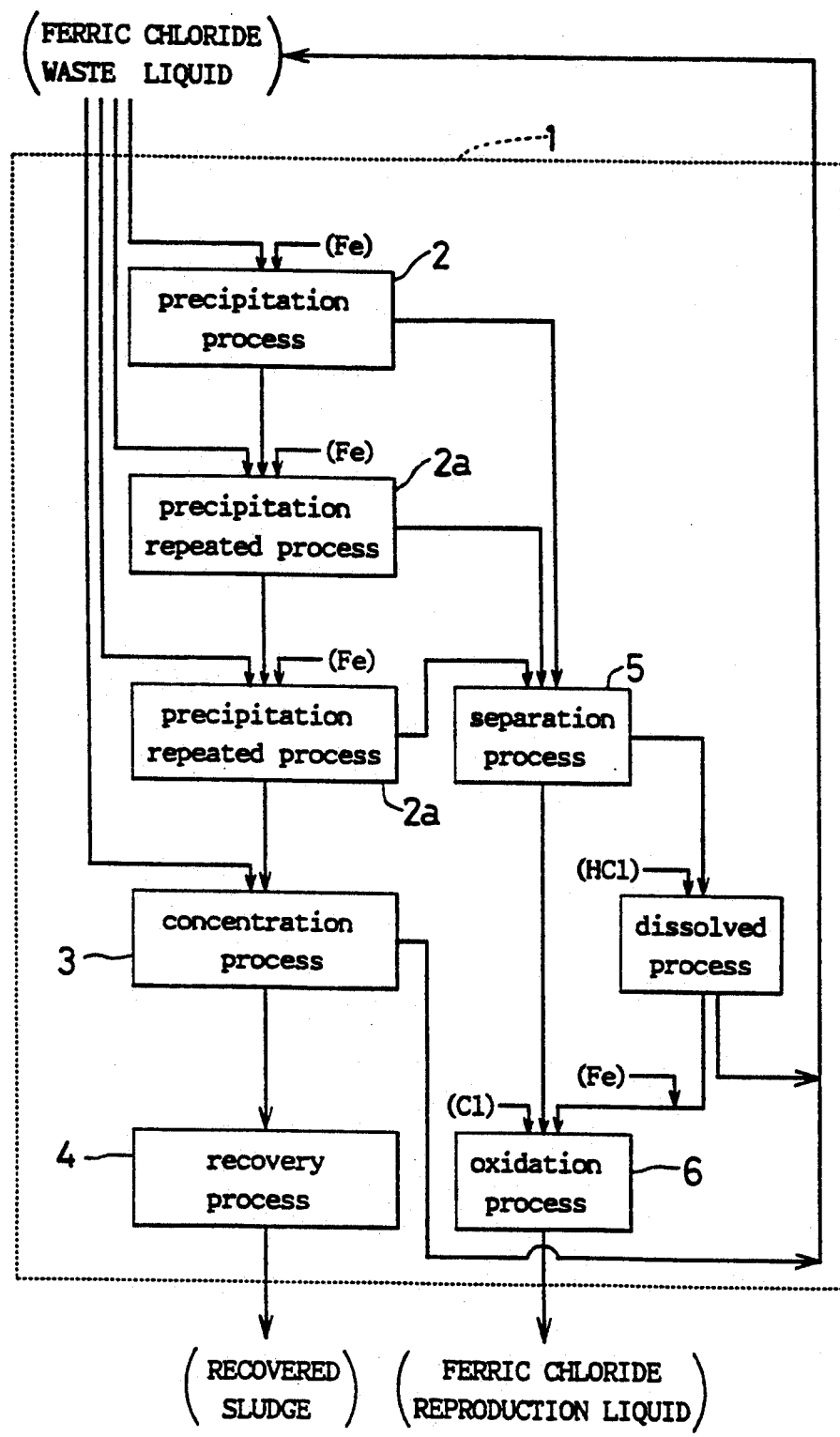
FIGS. 1 and 2 show a first embodiment of the present invention.
Figure 2:
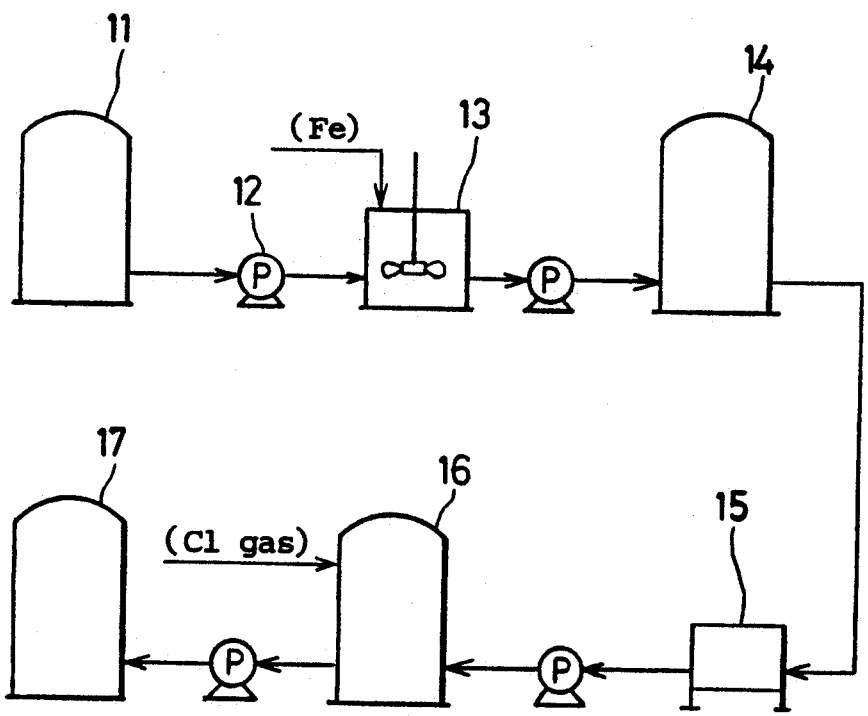

FIGS. 1 and 2 show a first embodiment of the present invention.

As shown in FIG. 1, a method for recovering nickel according to the present invention comprises a precipitation process (2) which is assembled in a reproduction process (1) of a ferric chloride liquid, a precipitation repeated process (2a) which is twice repeatedly applied to a sludge produced in that precipitation process (2), a concentration process (3) for dissolving an unreacted portion of an excessive metallic iron contained in the sludge after the second precipitation repeated process (2a) and a recovery process (4) for recovering the sludge which has the proportion of the nickel constituent increased by means of the concentration process (3).

Incidentally, the sludge used herein is taken in a broad sense as a precipitate including heavy metal precipitates precipitated by means of a reduction.

As shown in FIG. 2, during the aforementioned precipitation process (2), firstly a ferric chloride waste liquid used for etching stainless steel is poured into a reaction vessel (13) from a waste liquid storage tank (11) by means of a pump (12). Then, while metallic irons prepared as granules of about 5 mm in size are being added into this waste liquid, the waste liquid is stirred strongly and boiled by heating.

The added metallic ions are substituted for the heavy metal ions by this operation so that a ferrous chloride liquid can be produced as well as the nickel ions in the waste liquid can be so reduced as to be precipitated as the metallic nickel. This metallic nickel is precipitated as the sludge together with an unreacted portion of the excessively added metallic iron, a ferric hydroxide simultaneously produced and so on.

Incidentally, the reduction mentioned herein is so defined that the dissolved metal ions changes to metals resultantly by means of a substitution, an adsorption, a coprecipitation or other reactions.

At the time of completion of the aforementioned reaction, the suspension comprising the ferrous chloride liquid containing the ferric hydroxide of a comparatively small specific gravity is discharged to a processed liquid reservoir (14) leaving the sludge precipitated within the reaction vessel (13) and then the precipitation process (2) is completed.

The metallic iron to be added in this precipitation process (2) may be like a lump of more than 5 mm in size or to the contrary, may be like fine powder. Anyhow, the reaction is accelerated more rapidly as the surface area of the metallic iron is enlarged by preparing it fine. The reaction may be performed by heating the waste liquid to the temperature of about 40° C. But, the reaction can be accelerated remarkably by boiling it as mentioned above or elevating its temperature near to the boiling point.

Subsequently, a fresh ferric chloride waste liquid is poured from the waste liquid storage tank (11) into that reaction vessel (13), further the metallic iron is added newly and the heating is performed for boiling, and the precipitation repeated process (2a) in which the stirring is to be carried out strongly is performed repeatedly. This precipitation repeated process (2a) may be performed repeatedly till a remaining amount of the sludge increases so much that the stirring becomes impossible. According to this embodiment, the precipitation repeated process (2a) is performed twice.

Incidentally, the precipitation repeated process (2a) may adopt an addition of a suitable amount of hydrochloric acid for dissolving the ferrous hydroxide which has not been separated completely from the sludge in the preceding precipitation process (2).

Since an excessive portion of the metallic iron is remaining in the sludge deposited in the preceding precipitation process (2) and the precipitation repeated process (2a), this precipitation repeated process (2a) requires merely a little amount of metallic iron to be added newly. Thereupon, the unreacted metallic iron remaining in the sludge is substantially in a steady amount according to an amount of the waste liquid to be processed once. While, since the metallic nickel is apt to newly precipitate by a predetermined amount according to the amount of the processed liquid every repetition of this precipitation repeated process (2a), it becomes possible to greatly increase the proportion of the metallic nickel contained in the sludge and to improve the economical value of the recovered sludge by repetition of this precipitation repeated process (2a).

The sludge produced by the aforementioned precipitation process (2) and the precipitation repeated process (2a) can have the proportion of nickel and its precipitated amount increased by repetition of the precipitation repeated process (2a).

Just before the stirring becomes impossible due to an increase of the precipitated amount of the sludge, the concentration process (3) is performed.

That is, the ferric chloride waste liquid is newly poured to the sludge separated and remained in the reaction vessel (13), the heating is performed for boiling and the stirring is done strongly. After that, the sludge precipitates and the suspension liquid and the sludge are separated.

In this concentration process (3), the iron constituent of the sludge, namely the metallic iron remained as the unreacted portion added by the above-mentioned precipitation process (2) and precipitation repeated process (2a) is so dissolved as to react with the ferric chloride liquid. Thereupon, also the metallic nickel precipitated in the sludge dissolves partially by the ferric chloride waste liquid to produce the nickel ion. But, this nickel ion is reduced by the unreacted iron remaining in the sludge to precipitate as the metallic nickel again. As a result, the metallic iron constituent in the sludge is consumed much, but though the precipitated metallic nickel dissolves, its decreasing amount is a little and the proportion of the metallic nickel contained in the sludge increases relatively.

According to this embodiment, only the ferric chloride waste liquid is poured. But, thereupon a suitable amount of hydrochloric acid may be added thereto. While iron hydroxides in the suspension and metals in the sludge are dissolving by this addition of the hydrochloric acid, the iron constituent reacts upon the waste liquid and the hydrochloric acid to produce the ferrous chloride. As a result, since the metallic iron in the sludge is consumed, it becomes possible to increase the proportion of the metallic nickel contained in the sludge.

Further, according to this embodiment, the precipitation repeated process (2a) is performed after the precipitation process (2). But, the concentration process (3) may be applied directly to the sludge after the precipitation process (2). Also in this case, it is possible to increase the proportion of the metallic nickel contained in the sludge by the concentration process (3).

After the application of the aforementioned concentration process (3), the recovery process (4) is performed. That is, the separated suspension is returned to the waste liquid storage tank (11) together with the iron hydroxide of a comparatively small specific gravity. Then, the sludge deposited in the reaction vessel (13) is taken out and washed to recover such a sludge as to contain the nickel constituent much.

Incidentally, in the sludge according to the prior art to which only the aforementioned precipitation process (2) is applied, the iron constituent occupies more than 90% of the metallic constituent contained in the sludge and the nickel constituent occupies less than 10%. But, in the recovered sludge according to the present invention to which the precipitation repeated process (2a) is applied twice after the precipitation process (2) and then the concentration process (3) and the recovery process (4) are performed, it is possible to recover such a sludge as to contain the nickel constituent more than the iron constituent as shown in the following Table 1.

TABLE 1

| Recovered Sludge Constituent | Proportion (%) | To 100 of Whole of Metallic Constituent |
|---|---|---|
| Nickel | 17.8 | 56.7 |
| Chromium | 0.17 | 0.5 |
| Iron | 13.4 | 42.7 |
| Water | 48.4 | |
| Carbon, others | 20.23 | |

The whole of the process steps according to the present invention is completed at the recovery process (4). As the aforementioned waste liquid recovery process (1), as shown in FIGS. 1 and 2, the separation process (5) and the oxidation process (6) are applied to the ferrous chloride liquid discharged to the processed liquid reservoir (14).

That is, in the separation process (5), the ferrous chloride liquid stored in the processed liquid reservoir (14) is sent to a filter press (15) so as to remove the solid constituent such as the ferrous hydroxide therein.

The ferrous chloride liquid from which the solid constituent has been removed is sent to a chlorine reaction vessel (16) so that the oxidation process (6) is performed by use of the chlorine gas to reproduce it as the ferric chloride liquid.

The ferric chloride liquid reproduced in that way is stored in a ferric chloride liquid vessel (17) so as to be reused for etching.

On one hand, the of the solid constituent removed by the filter press (15) is dissolved by the hydrochloric acid soon after recovery. In case that the nickel constituent of the metallic constituent is only a little, the metallic iron is added so as to react with the remaining hydrochloric acid and then it is sent to the processed liquid tank (14). To the contrary, in the case of the much nickel constituent, it is returned to the waste liquid storage tank )11) and the aforementioned reproduction process (1) is applied to it. Accordingly, also this metallic constituent can be recycled without any waste for reuse.

Second Embodiment

Figure 3:
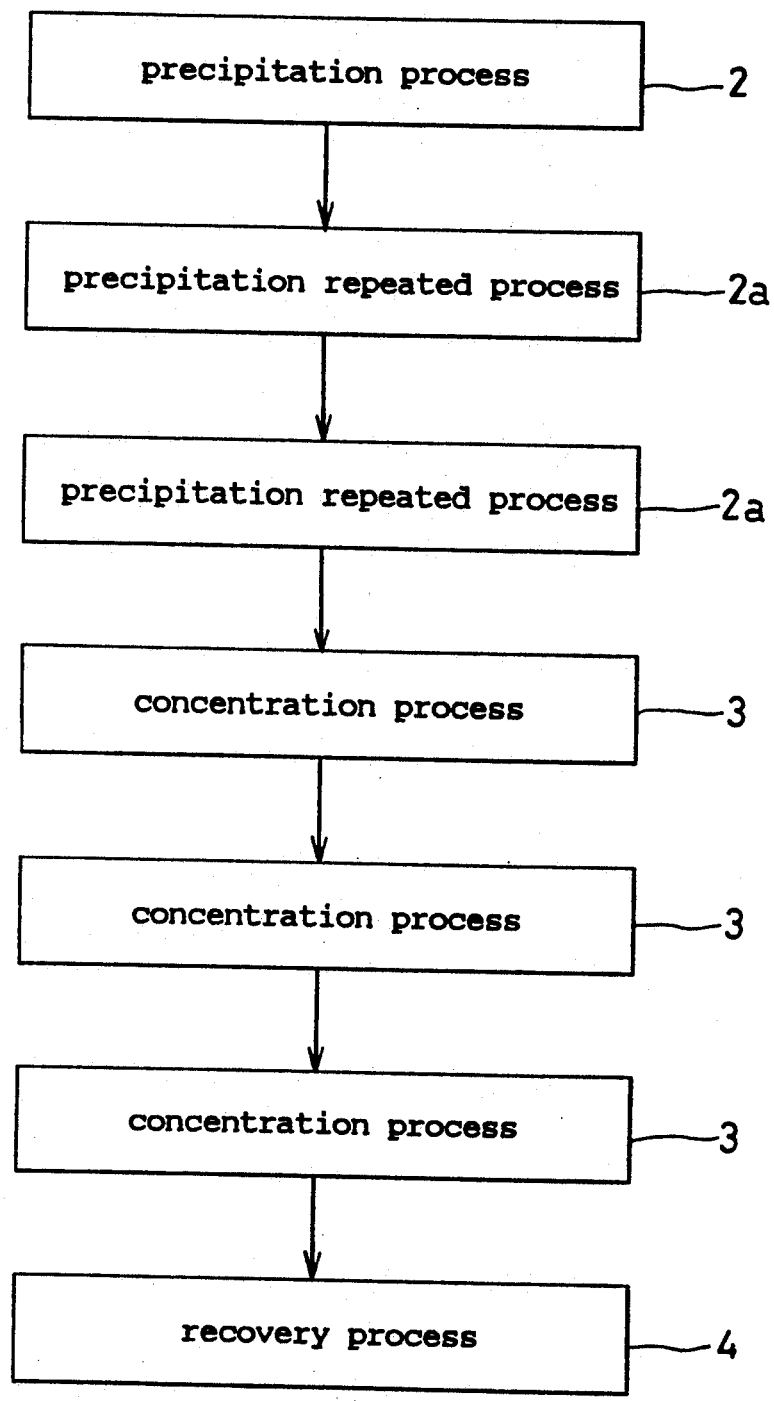
FIG. 3 is a flowchart of a second embodiment of the present invention.

FIG. 3 is a flowchart showing a second embodiment of the present invention.

This embodiment comprises the precipitation process (2), the twice precipitation repeated process (2a), the triple concentration process (3) and the recovery process (4).

Firstly, in the precipitation process (2), the suspension separated in the concentration process (3) during the preceding metallic nickel recovery step is used as the treatment liquid. For the other conditions, the same operations as those in the precipitation process (2) in the first embodiment are performed.

As explained in the first embodiment, since the metallic iron is not added in the concentration process (3), the nickel ion is contained comparatively much in the suspension separated in the concentration process (3). According to this embodiment, since this suspension is used as the treatment liquid and treated by the precipitation process (2), the nickel ion contained in this suspension is reduced to the metallic nickel so that the nickel constituent can be recovered efficiently.

Subsequently, the precipitation repeated process (2a) is performed twice in succession. Also in this case, similarly to the aforementioned precipitation process, the suspension separated in the former concentration process (3) is used. For the other conditions, the same operations as those in the precipitation repeated process (2a) of the above-mentioned first embodiment are performed.

After the second precipitation repeated process (2a) has been performed, the concentration process (3) is performed. In this case, the original liquid of the ferric chloride waste liquid is poured into the sludge separated in the precipitation repeated process (2a) and the same operations as those in the first embodiment are performed.

Since the sludge after this concentration process (3) still contains much unreacted iron, further the concentration process (3) is applied to the sludge twice. By this triple concentration process (3), an amount of the metallic nickel contained in the sludge is decreased a little and the unreacted iron in the sludge is consumed considerably. As a result, the proportion of the metallic nickel contained in the sludge increases remarkably.

After that, the recovery process (4) is performed similarly to the first embodiment.

What is claimed is:

1. A method for recovering metallic nickel from a waste liquid from an etching solution for metallic plates, which liquid comprises ferric chloride and nickel ions, which method comprises the steps of:
 (a) adding metallic iron to the waste liquid;
 (b) heating and stirring the waste liquid from step (a) to reduce and precipitate the nickel irons as metallic nickel and to reduce the ferric chloride to ferrous chloride;
(c) separating out a sludge comprising the metallic nickel and metallic iron;
(d) adding a fresh waste liquid comprising ferric chloride and nickel ions to the sludge from step (c) to obtain a diluted sludge;
(e) dissolving iron constituents of the diluted sludge by heating and stirring and precipitating nickel ions to metallic nickel to obtain a concentrated metallic nickel sludge and a ferrous chloride suspension; and
(f) separating the concentrated metallic nickel sludge from the ferrous chloride suspension.

2. A method according to claim 1 wherein hydrochloric acid is added to the sludge with the fresh waste liquid in step (d).

3. A method according to claim 1 or claim 2 wherein concentration steps (d) and (e) are repeated one or more times prior to separating the metallic nickel.

4. A method according to claim 1 wherein metallic iron is added with the fresh waste liquid in step (d).

5. A method according to claim 3 wherein particulate metallic iron is added with the fresh waste liquid in step (d).

6. A method for recovering metallic nickel from a waste liquid from an etching solution for metallic plates, which liquid comprises ferric chloride and nickel ions, which method comprises the steps of:
(a) adding metallic iron to the waste liquid;
(b) heating and stirring the waste liquid from step (a) to reduce and precipitate the nickel ions as metallic nickel and to reduce the ferric chloride to ferrous chloride;
(c) separating out a sludge comprising the metallic nickel and metallic iron;
(d) adding a fresh waste liquid comprising ferric chloride and nickel ions to the sludge from step (c) to obtain a diluted sludge;
(e) dissolving iron constituents of the diluted sludge by heating and stirring and precipitating nickel ions to metallic nickel to obtain a concentrated metallic nickel sludge and a ferrous chloride suspension;
(f) separating the concentrated metallic nickel sludge from the ferrous chloride suspension;
(g) adding metallic iron to the ferrous chloride suspension from step (f);
(h) heating and stirring the ferrous chloride suspension with added metallic iron from step (g) to reduce and precipitate the nickel ions as metallic nickel;
(i) separating out a sludge comprising the metallic nickel and the metallic iron;
(j) adding a fresh waste liquid comprising ferric chloride and nickel ions to the sludge from step (i) to obtain a diluted sludge;
(k) dissolving iron constituents of the diluted sludge from step (j) by heating and stirring and precipitating nickel ions to metallic nickel to obtain a concentrated metallic nickel sludge and a ferrous chloride suspension; and
(l) separating the concentrated metallic nickel sludge from the ferrous chloride suspension.

7. A method according to claim 6 wherein concentration steps (f) to (k) are repeated one or more times prior to separating the metallic nickel.

8. A method according to claim 6 or claim 7 wherein hydrochloric acid is added to the sludge with the fresh waste liquids in steps (d) and (j).

9. A method according to claim 6 or claim 7 wherein concentration steps (j) and (k) are repeated one or more times prior to separating the metallic nickel.

10. A method according to claim 6 or claim 7 wherein metallic iron is added with the fresh waste liquid in step (j).

11. A method according to claim 6 or claim 7 wherein particulate metallic iron is added with the fresh waste liquid in step (j).

* * * * *

UNITED STATES PATENT AND TRADEMARK OFFICE
CERTIFICATE OF CORRECTION

PATENT NO. : 5,284,505

DATED : February 8, 1994

INVENTOR(S) : Keiichi TACHIBANA et al.

It is certified that error appears in the above-indentified patent and that said Letters Patent is hereby corrected as shown below:

<u>TITLE PAGE</u>

Please change the Assignee from "Hakima Kasaku Kogyo Kabushiki Kaisha" to --Harima Kagaku Kogyo Kabushiki Kaisha--.

Signed and Sealed this

Twenty-seventh Day of December, 1994

Attest:

BRUCE LEHMAN

Attesting Officer     Commissioner of Patents and Trademarks